No. 778,240. Patented December 27, 1904.

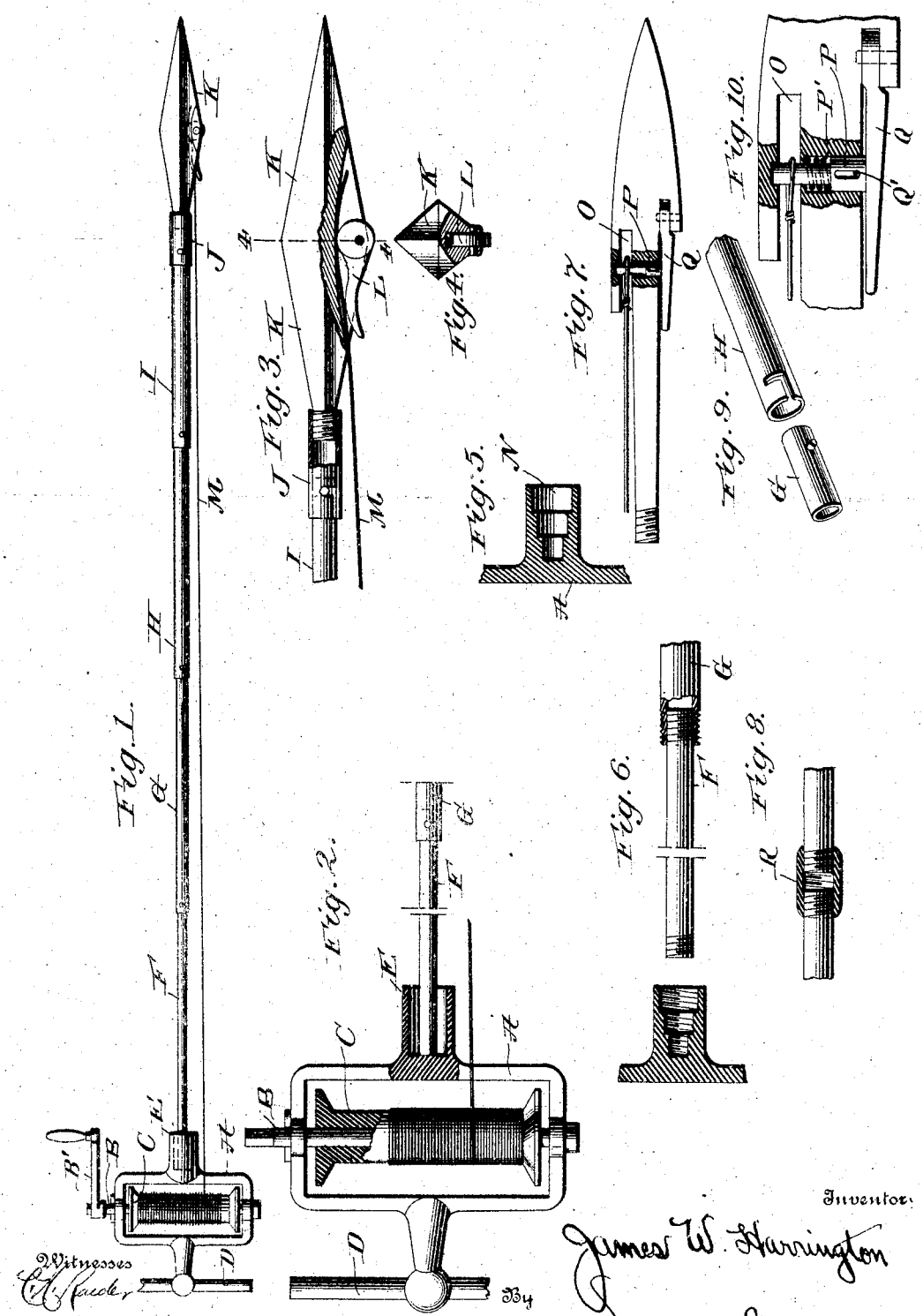

UNITED STATES PATENT OFFICE.

JAMES WILLIAM HARRINGTON, OF HAMPTON, MISSOURI.

APPARATUS FOR FASTENING OR TYING HAYRICKS OR THE LIKE.

SPECIFICATION forming part of Letters Patent No. 778,240, dated December 27, 1904.

Application filed October 14, 1904. Serial No. 228,478.

*To all whom it may concern:*

Be it known that I, JAMES WILLIAM HARRINGTON, a citizen of the United States, residing at Hampton, in the county of Platte and State of Missouri, have invented certain new and useful Improvements in Apparatus for Fastening or Tying Hayricks or the Like, of which the following is a specification.

My present invention pertains to improvements in apparatus for fastening or tying hayricks and the like, the construction and advantages of which will be hereinafter set forth, reference being had to the annexed drawings, wherein—

Figure 1 is a side elevation of the apparatus or device; Fig. 2, an enlarged plan, partly in section, of the reel-holder, handle, and one of the joints of the rod; Fig. 3, an enlarged view of the spear or needle head, partly in section; Fig. 4, an end view thereof, partly in section, the section being indicated by the line 4 4 of Fig. 3; Fig. 5, a sectional view of a portion of the reel-holder, showing a slightly-modified form of the rod-socket formed therein; Fig. 6, a similar view showing a still further modification of the reel-holder and also of the rod; Fig. 7, a side elevation of a modified form of the spear or needle head; Fig. 8, a detail view of a modified form of connection between the rod-sections; Fig. 9, a perspective view of the joint employed with the construction illustrated in Figs. 1, 2, and 3; and Fig. 10, an enlarged view of the spear or head shown in Fig. 7.

The object of the present invention is to provide means whereby a wire, cord, or the like may be passed completely through a hay rick or stack with a view of binding the same and holding it intact.

With the present construction the wire may be forced or carried through the stack or rick at a point below the top thereof and the wire then passed or thrown over the top thereof and tied upon the other side. In this manner the rick or stack may be fully protected and, if desired, a cover or tarpaulin bound down upon the same.

The apparatus may be said to comprise a sectional rod or needle provided with a spear-shaped head-carrying means to hold the end of the wire or binder and a reel-carrier, said carrier having a suitable socket or the like to receive the adjacent end of the rod or needle section and a suitable handle to which sufficient pressure may be applied to force the needle through the stack.

Referring to Figs. 1 to 5, inclusive, and Fig. 9, A denotes the reel holder or frame, preferably rectangular in form and provided with an axle or spindle B for supporting the reel C. The holder is likewise provided with a handle D and with a socket or recess E at its forward side. The rod or needle proper comprises a series of rods or rod-sections, four being shown in Fig. 1 and lettered, respectively, F, G, H, and I. It is to be understood, of course, that any number of sections may be employed and that the number used at any one time will vary according to the dimensions of the stack or rick. The socket E is made sufficiently large to receive the coupling member J, secured upon the end of the spear or head K, and as a consequence will accommodate the end of the small section, as indicated in Fig. 2. The rod-sections and the coupling member J are secured to each other by a socket-and-bayonet joint, as illustrated in Fig. 9. Head K is slotted, and a cam-lever L is mounted therein, said lever when it is turned down, as in Figs. 3 and 4, binding and holding the wire M, which passes from the reel.

In Fig. 5 the reel-holder is formed with a socket N of varying diameters. In Fig. 6 the socket is of varying diameters and is internally threaded. The threaded sections are designed to receive the threaded ends of the various rod-sections, the sections under this construction being threaded, as shown.

The needle-head (shown in Fig. 7) is formed with a slot O, into which the looped end of the binding-wire is passed. A pin P, mounted in a transverse opening in the head, passes through the loop and is retained in position by a swinging latch Q. As will be seen upon reference to Fig. 9, the pin is surrounded by a spring P', which tends to move it outwardly and out of engagement with the loop on the wire. The pin is retained within the head by a cross pin or screw Q', which works in a slot formed in pin P.

In Fig. 8 the rod-sections are of the same diameter and are secured together by an internally-threaded coupling R.

In operation the end of the wire or cord is secured in the head and the head is forced into the rick, the socket at such time bearing directly on the head or the short coupling attached thereto. When the head is forced in, the reel-carrier is withdrawn and a section of the rod made fast to the head and the parts again forced inwardly. This is continued, sections of the rod being added from time to time until the head, with the attached wire, appears upon the opposite side of the rick. The spool or reel is then removed from the carrier and thrown over the rick, or the carrier, with the spool therein, may be thrown over. After the wire is fastened the instrument is withdrawn and the operation again repeated. A crank or handle B' may be applied to the reel-spindle, as shown in Fig. 1.

It is manifest that the invention may be varied as to many of its details without departing from the spirit of the invention, as will be readily appreciated upon reference to the modifications above outlined.

While I have referred to the apparatus as being employed for tying stacks and ricks, it is of course to be understood that its applicability is general.

Having thus described my invention, what I claim is—

1. In an instrument of the character described, the combination of a head provided with means for securing a cord or wire thereto; a reel-carrier and a rod interposed between said head and carrier.

2. In an instrument of the character described, the combination of a head provided with means for securing a cord or wire thereto; a reel-carrier; and a sectional rod interposed between the two.

3. In an instrument of the character described, the combination of a head provided with means for securing a cord or wire thereto; a reel-carrier; a sectional rod interposed between the two; and means for securing said sections together.

4. In an instrument of the character specified, the combination of a reel-carrier provided with a socket in its forward face; a sectional rod seated at one end in the socket; a head carried at the opposite end of the rod; and means carried by the head for securing a wire or the like thereto.

5. In an instrument of the character specified, the combination of a reel-carrier; a handle carried thereby; a sectional rod bearing at one end in a socket formed in the forward face of the reel-carrier; a head mounted upon the opposite end of the rod; and means carried by the head for securing a wire or the like thereto.

6. In an instrument of the character specified, the combination of a reel-carrier; a rod; and a head carried by the rod, said head being formed with a slot adjacent to its rear end; a pin extending across the slot; and means for securing the pin in place.

In testimony whereof I have signed my name to this specification in the presence of two subscribing witnesses.

JAMES WILLIAM HARRINGTON.

Witnesses:
A. B. ELLIOTT,
R. T. BRIGHTWELL.